Patented Apr. 15, 1924.

1,490,541

UNITED STATES PATENT OFFICE.

GEORGE S. SHAILOR, OF NEW YORK, N. Y., ASSIGNOR TO AXEL WALDEMAR HALLEN-BORG, OF NEW YORK, N. Y.

COMPOSITE MATERIAL AND METHOD OF MAKING THE SAME.

No Drawing.   Application filed June 25, 1920. Serial No. 391,768.

*To all whom it may concern:*

Be it known that I, GEORGE S. SHAILOR, a citizen of the United States, residing in the city, county, and State of New York, have made a certain new and useful invention in Composite Materials and Methods of Making the Same, of which the following is a specification.

This invention relates to composite material and method of making the same, and more particularly to such material when made from fibrous pulp having a suitable substance incorporated therein to impart the necessary or desired plastic, thermoplastic or other qualities thereto.

The object of the invention is to provide a composite material of the nature referred to and a method of making the same which is exceedingly simple and efficient and capable of being carried out practically, expeditiously and economically.

Other objects of the invention will appear more fully hereinafter.

In the manufacture of various articles of commerce, such for example as phonograph records, ceiling boards, moving picture scenery and settings, screens, ends of music rolls, and many others, which, generally, may be molded or pressed into shape, either with or without the application of heat, it is desirable to employ materials which are cheap and abundant, which, when properly combined will result in the production of a composite structure possessing the necessary characteristics to enable it to be manipulated or worked into the desired article, which article will possess the requisite properties according to the use to which it is to be put. For example, phonograph record disks as heretofore most commonly made are constructed of thermoplastic compositions consisting ordinarily of shellac, an abrasive material, such as chalk, silica, etc., a filler or binder, such as cotton flock and coloring matter. The composition is usually pressed into disk form in dies under pressure and heat. Such method and the record disks made in this way are open to many and serious objections. The materials required are expensive and the disks are fragile and easily broken. Where the use of fibrous material has been attempted as a base or body material for the disk, and a thermoplastic compound is applied to the surface of the fibrous body and the thus coated disk is subjected to heat and pressure to stamp the record or sound grooves upon the surface thereof, the body material is compressed under die stamping pressure, and such body being more or less resilient, it tends to resume its initial state or form after the pressure is relieved, thereby more or less wiping out, changing or distorting the sound grooves impressed upon the surface thereof and hence spoiling or at least impairing the record.

Again, in the case of ceiling boards, moving picture scenery or settings, screens, music roll ends, and many other articles of like nature, economy demands the use of cheap materials which, however, must possess sufficient plasticity and adhesiveness as to be capable of being formed into the desired shape, while still plastic, and to retain such shape after it is produced.

It is among the special purposes of my invention to avoid the objections and to attain the advantages and benefits noted and others, and to provide a composite material and a method of making the same which will secure and maintain permanency of shape and form for use in making phonograph record disks, which is plastic and adhesive or cohesive and can be molded or otherwise formed into shape, and which, in the case, for example, of phonograph record disks, is not frangible nor resilient and will not vary or distort the sound grooves impressed thereon, and above all, which is economical.

In carrying out my invention I employ for a base material a fibrous pulp. For this purpose the ordinary paper mill pulp or any fibrous material, such as wood, rags, paper or the like, reduced to pulp similar to paper mill pulp will answer the purpose. The pulpy mass is run onto a traveling screen or felt in a thin layer or sheet or is otherwise formed into sheets, while still in wet pulpy condition, and the surface thereof is sprinkled over with a suitable binder material either in the form of a dry powder, in semi-solid, or a liquid. Where an ordinary traveling felt or screen is employed, such as is used in paper mills, the pulp mass, after being sprinkled over with the binder material is conveyed to and around a cylinder and while applied to the cylinder is subjected to pressure, and also to heat where the use to which the material is to be put requires it. The sprinkled material is thus wound upon itself in successive layers under pressure until the desired thickness is attained. Where the pulp material is formed into sheets each sheet is in like manner sprinkled over with the binder material and the sprinkled sheets are superposed the one upon another until the desired thickness is attained and then the piled sheets are subjected to pressure, or to heat and pressure. Where the pulpy mass is to be molded into a desired shape it is in like manner sprinkled over with the binder material and run into the shaping molds and while still in plastic condition is pressed into the required shape under pressure, or under both pressure and heat according to the requirements.

The character of binder material to be employed will depend upon the article to be produced. For instance, where phonographic record disks are to be made a thermoplastic material or gum is desirable, such as resin, shellac, cowrie, or copal may be used. In the case of other articles, where thermoplastic characteristics are not required ordinary plaster of Paris is suitable.

Whatever may be the character of the binder material the pressure to which the pulp mass with the binder sprinkled thereover or otherwise applied thereto is subjected should be sufficient to press or force the binder material into the body or mass of pulp. The wet pulpy condition of said mass lends itself to this action. The result is that the binder material becomes incorporated into the body of the pulpy mass. The binder material should be applied in sufficient quantities to secure the desired plasticity and coherence in the mass for the purposes and uses to which the articles to be made therefrom are to be put and according to the nature of such articles.

The important feature of my invention resides in incorporating a binder material within the body of a fibrous pulp while the latter is in the condition of a pulpy mass, such binder material having or not having thermoplastic properties, according to the nature and desired characteristics of the article to be produced. The incorporation of the binder material into the body of the fibrous pulp obviously may be effected, in the broadest scope of my invention, in many different ways. The method above described of applying the binder to one surface of the pulpy mass and then subjecting such mass to pressure I have found practical and satisfactory. I have also found it practical and satisfactory to form the pulp mass to which the binder has been applied into layers and then to apply pressure to the layers, or the pressure may be applied while the layers are being superposed upon each other. The usual pressure employed in paper mills in the manufacture of paper pulp I have found to be satisfactory. It is also satisfactory to run the pulp to which the binder material has been applied into molds and then to apply pressure sufficient to cause the pulp mass to conform to the configuration of the mold. Under the influence of the pressure, whether applied in either or any of these ways the binder material is forced into and becomes incorporated with the body of the pulpy mass to form the composite material. The application of heat depends likewise upon the characteristics which it may be desired to impart to the articles to be produced. Where thermoplastic material is employed as the binder ordinarily the application of heat is required in order to render the thermoplastic binder sufficiently plastic to enable the composite material to be stamped or otherwise formed into the desired article. A temperature sufficient for this purpose and depending upon the particular thermoplastic material employed is all that is required.

I have found that composite material produced in the manner above described when used, for example, in the manufacture of phonograph record disks is free from resiliency and consequently when the sound grooves are pressed or stamped into the surface of disks made from such material there is no tendency for the body of the material to expand after the stamping pressure has been relieved thereby distorting and impairing the sound grooves. Such material is not frangible nor easily ruptured. It is exceedingly cheap to manufacture and it is capable of being molded or pressed while still in a plastic condition into permanently retained shape thereby rendering it suitable for use in the manufacture of various articles.

Having now set forth the objects and nature of my invention and the manner of carrying the same into practical operation, what I claim as new and useful, and of my own invention, and desire to secure by Letters Patent is:—

1. The method of manufacturing non-resilient composite material which consists in forming fibrous material into a sheet of pulp and pressing a thermoplastic binder material into the body of the pulp sheet while still in pulpy condition.

2. The method of manufacturing non-resilient composite material which consists in forming fibrous material into a pulpy mass and running said mass into a thin sheet, then applying a thermoplastic material to the surface of said sheet while the mass is in pulpy condition, and finally pressing the thermoplastic material into the body of such sheet.

3. The method of manufacturing non-resilient composite material which consists in forming fibrous material into a pulpy mass and running said mass into a thin sheet, then applying a thermoplastic binder material to the surface of the sheet and subjecting the sheet and binder material to heat and pressure while the mass is in pulpy condition.

4. The method of manufacturing non-resilient composite material which consists in forming fibrous material into the pulpy mass and applying a thermoplastic binder material to the surface thereof while in a pulpy condition and subjecting the mass in layers with the binding material applied thereto, to pressure to force the binding material into the body of the mass.

5. The method of manufacturing non-resilient composite material which consists in forming fibrous material into a pulpy mass and applying a thermoplastic binder material to the surface thereof and pressing said binder material into the body of the mass while still in a pulpy condition.

6. The method of manufacturing non-resilient composite material which consists in forming fibrous material into a pulpy mass and applying a thermoplastic binder material to the surface thereof and subjecting the mass to pressure while still in pulpy condition and with the binder material applied thereto to force the binder material into the body of the pulpy mass.

In testimony whereof I have hereunto set my hand on this 23rd day of June, A. D. 1920.

GEORGE S. SHAILOR.